June 19, 1951   M. P. BANNISTER ET AL   2,557,252
MOBILE MILK COOLER

Filed Nov. 19, 1948   2 Sheets-Sheet 1

INVENTORS
MELVIN P. BANNISTER
JOHN F. PFEIFER

BY

ATTORNEYS

June 19, 1951 M. P. BANNISTER ET AL 2,557,252
MOBILE MILK COOLER
Filed Nov. 19, 1948 2 Sheets-Sheet 2
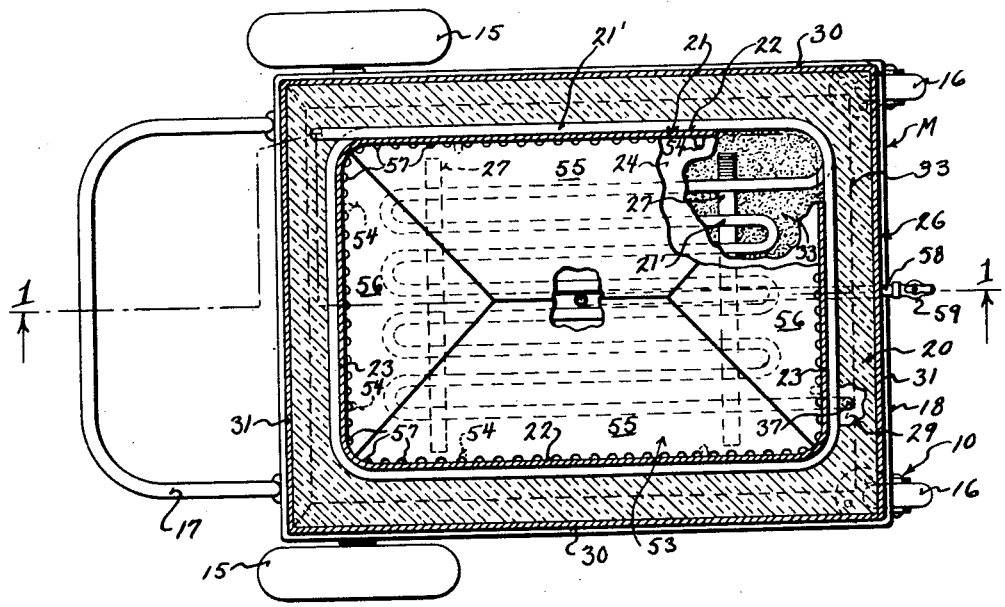
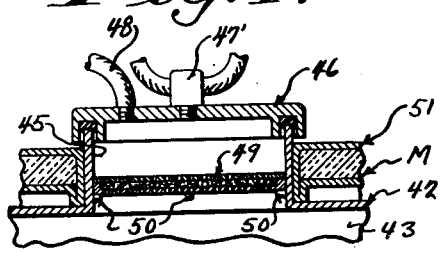
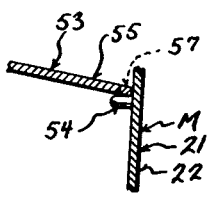
INVENTORS
MELVIN P. BANNISTER
JOHN F. PFEIFER
BY
ATTORNEYS Patented June 19, 1951

2,557,252

UNITED STATES PATENT OFFICE 2,557,252

MOBILE MILK COOLER

Melvin P. Bannister, West Allis, and
John F. Pfeifer, Wauwatosa, Wis.

Application November 19, 1948, Serial No. 61,068

1 Claim. (Cl. 62—141)

This invention appertains broadly to refrigeration and more particularly to a novel milk cooler.

One of the primary objects of our invention is to provide a novel mobile cooler for receiving the milk directly from the milking machine, as the cows are being milked, whereby to effectively and instantly reduce the temperature of the milk and thereby prevent the growth of bacteria.

Another salient object of the invention is to provide a mobile milk cooler embodying a receiving tank for milk storage with means for cooling the milk as the same is received from the milking machine, the storage tank effectively holding the milk until the same is ready for shipping to market.

A further object of the invention is to provide a milk cooler which can be readily moved along the barn as the cows are being milked by the milking machine, the cooler receiving the milking machine pail cover, so that the milk is received directly in the cooling tank and whereby, in effect, the cooling tank forms a part of the milking machine.

A still further object of our invention is to provide a mobile device embodying a tank to take the place of the milking machine pail having in conjunction therewith an electric refrigerating unit for cooling the tank and, consequently, the milk.

A still further important object of our invention is the provision of a novel movable baffle plate or partition disposed directly below the covers of the milking machine which carry the pulsators, so that as the milk enters the tank the baffle plate will direct the milk in fine streams toward all of the cold side walls of the tank and thereby instantly lower the temperature of the incoming milk.

With these and other objects in view, the invention consists in the novel construction, arrangement and formation of parts, as will be hereinafter more specifically described and claimed, and illustrated in the accompanying drawings, in which drawings:

Figure 3 is a horizontal sectional view taken on the line 3—3 of Figure 1, looking in the direction of the arrows, the view showing the bottom of the tank in plan with parts thereof broken away to illustrate structural detail.

Figure 4 is an enlarged fragmentary detail sectional view through the top of the mobile milk cooler illustrating the means of associating the usual milk pail cover of the milking machine with the cooler.

Figure 5 is an enlarged detail vertical sectional view taken on the line 5—5 of Figure 1, looking in the direction of the arrows, illustrating the means employed for removably holding the baffle or partition plate in position within the tank.

Figure 1:
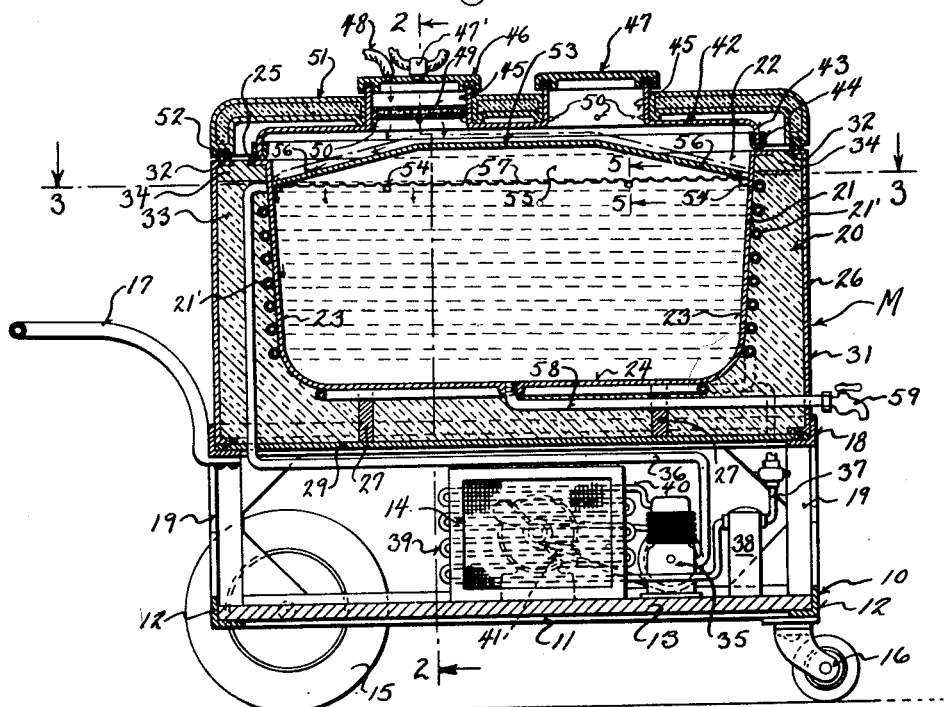
Figure 1 is a central vertical sectional view through the mobile milk cooler, the section being taken on the line 1—1 of Figure 3, looking in the direction of the arrows.

Referring to the drawings in detail, wherein similar reference characters designate corresponding parts throughout the several views, the letter M generally indicates our novel mobile milk cooling machine and as illustrated the same includes a wheeled carriage 10, so that the cooler can be readily moved from place to place. The wheeled carriage can take any preferred form, but as shown, the same includes a bottom frame or chassis constructed from longitudinally extending side rails 11 and end transverse rails 12. These rails support a platform 13 on which can be conveniently supported the refrigerating machine 14, which will be later set forth. The rear end of the frame can carry stub axles on which are rotatably mounted rubber tired wheels 15. The front end of the carriage supports caster wheels 16. A handle 17 of any desired form is secured to the device so that the same can be easily pushed or pulled from place to place.

Arranged above the platform 13 in spaced relation thereto is a second frame 18 and corner angle iron posts 19 can be employed for holding the frame 18 rigidly in place. This frame supports the cooler 20 per se.

The cooler 20 includes a tank 21, preferably, but not necessarily, formed from stainless steel or glass. This tank includes side and end walls 22 and 23 and a bottom wall 24. The side and end walls gradually taper inwardly toward the bottom wall and all corners are preferably rounded to facilitate cleaning. The upper edges of the side and end walls can be flanged outwardly as at 25, if so desired. The tank 21 is arranged within an outer protecting shell 26 and the tank is spaced at all points from the shell. Suitable supports 27 can be placed between the bottom wall 29 of the shell and the bottom wall 24 of the tank. The upper edges of the side and end walls 30 and 31 of the shell can be flanged inwardly as at 32 toward the flange 25 of the tank. Insulating material 33 is placed between the shell and the tank, as can be best seen from Figures 1, 2 and 3. If preferred, spacer members 34, formed of wood or the like, can be placed between the upper edges of the tank and shell walls and the flanges of the tank and shell walls 25 and 32 are placed over the separator members 34.

The refrigerating mechanism 14 is utilized for cooling the tank and cold plates or the like can be placed against the side, end and bottom walls of the tank. Preferably, however, cooling coils 21' are placed around and in relative close engagement with the side and end walls of the tank and against the bottom wall of the tank. This refrigerating mechanism includes the usual compressor 35 and the inlet of this compressor is connected directly to the suction or return pipe 36 for the coolant and this pipe 36 is coupled with the top of the cooling coils for the side and end wall of the tank. The outlet of the lower cooling coils is connected with a feed pipe 37. This pipe in turn communicates with the expansion tank 38 and this tank in turn communicates with the lower side of a condenser coil 39. The upper end of the condenser coil 39 is connected as at 40 to the outlet of the compressor. Cooling air is forced past the coil 39 by an electrically operated fan 41. The refrigerating mechanism 14 is of the ordinary type now found on the open market, and hence has not been described in complete detail. Obviously, however, the coolant under pressure is forced to the coils for the tank and is then returned back to the compressor. Likewise, any desired type of thermostatic control can be provided for the tank and its refrigerating mechanism.

A cover 42 can be provided for the upper end of the tank and this cover is preferably, but not necessarily, formed from stainless steel. The peripheral edge of the cover can be provided with a down turned flange 43 and this flange can in turn be provided with a suitable rubber or like gasket 44 for engaging the top of the tank. Not only does the gasket provide a close fit but also eliminates metal to metal contact. This cover 42 is provided with one or more receiving necks 45 upon which is fitted the milking machine pail cover 46. As illustrated, in Figure 1, we have shown one cover 46 in place and the other neck of the tank closed by a cap plate 47. Thus, in the instance shown, only one milking machine cover 46 is illustrated. Where a machine is built for receiving only one cover 46, the neck carried by the cover can be centrally located. The cover 46 is of the type now commonly used with milking machines and will not be described in detail, but it is to be noted that this cover carries the pulsators 47' and the vacuum line tubing 48. In certain instances where conventional covers 46 do not accurately fit the cover necks, adaptors can be utilized. Filters 49 are employed below the covers and the necks 45 can be provided with pins 50 for supporting these filters and, obviously, the filters can be readily removed for cleaning. In conjunction with the removable cover 42, we employ an insulated protecting cover 51. This protecting cover 51 can include inner and outer skins with insulation therebetween. The protecting cover can fit snugly around the necks and against the top of the outer protecting shell 26. A rubber or like gasket 52 can be carried by the protecting cover for engaging the shell.

Figure 2:
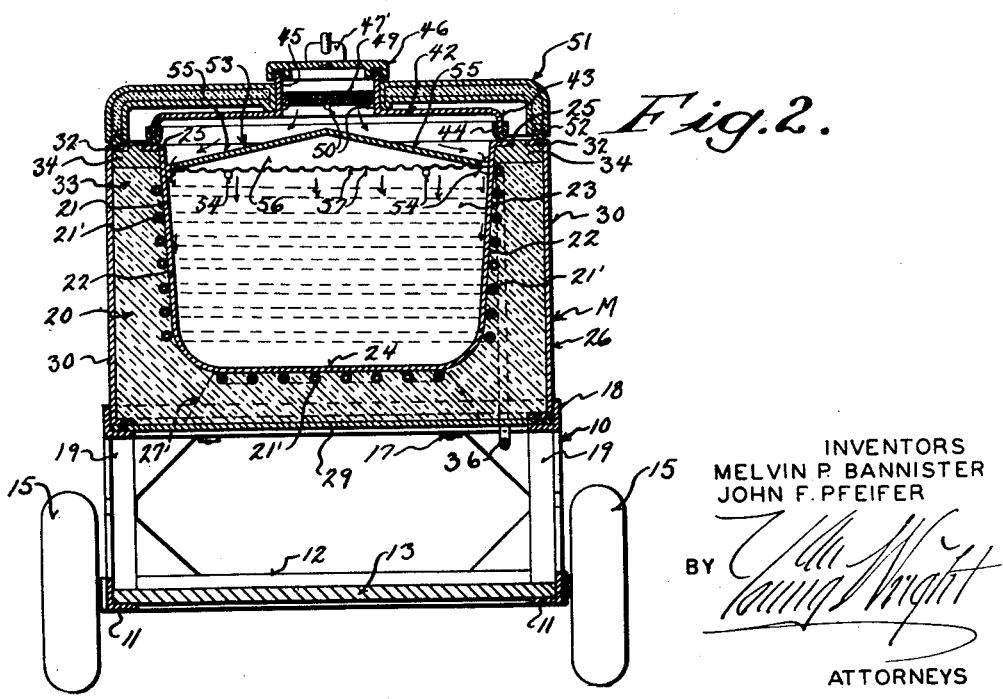
Figure 2 is a transverse sectional view taken on the line 2—2 of Figure 1, looking in the direction of the arrows.

One of the important features of our invention is the provision of the novel baffle or partition distributing plate 53. This plate is disposed directly below the receiving necks 45 and is detachably fitted upon supporting pins 54 carried by the inner faces of the walls of the tank. This baffle or distributing plate 53 is formed from material which can be readily cleaned and sterilized. As illustrated in Figures 1, 2 and 3 the baffle and distributing plate 53 is provided with inclined sides 55 and inclined ends 56. The sides incline downwardly from a central longitudinal line and hence the milk entering into the tank will flow down the inclined sides and ends of the baffle plate and will be directed toward the cold sides of the tank. The peripheral edges of the baffle and distributing plate 53 are provided with equidistantly spaced notches 57 and these notches allow the flow of milk from off the baffle plate in fine streams down the sides of the tank.

In use of our mobile milk cooler the covers 46 are placed in position and the milking machine is operated in the ordinary manner. Just prior to the milking process, the tank can be pre-cooled, if so desired. As stated, as the milk flows off the baffle plate and down the sides of the tank the milk temperature is instantly reduced and as the level of the milk rises in the tank, the warm milk will flow into the cool milk and, consequently, the incoming milk temperature will also be lowered. As the refrigerating mechanism operates the entire tank of milk will be effectively cooled and maintained at a certain desired temperature.

The bottom of the tank can be provided with an outlet drain pipe 58 atnd this pipe extends to the outside of the casing shell and is provided with a spigot 59. This facilitates the filling of shipping cans with the cooled milk. However, the tank can be emptied in any other desired way. Likewise, the tank can be of any desired shape and an endless track can be substituted for the wheels on the carriage or frame.

All of the parts of our device which come in contact with the milk can be readily cleaned and sterilized and it is to be particularly noted that the baffle and distributing plate 53 is freely removable for this purpose as is the tank cover 42.

In actual practice the protective cover 51 can be hinged to the shell, should such be preferred. In the present showing this protecting cover 51 is also freely removable from the shell.

From the foregoing description, it can be seen that we have provided a mobile milk cooler which can be effectively used in the barn for receiving milk directly from the milking machines and which thereafter can be used for holding the milk in storage at a certain temperature until ready for shipping.

Changes in details may be made without departing from the spirit or the scope of the invention, but what we claim as new is:

A mobile milk cooler comprising a wheeled hand truck, an elevated milk receiving and storage tank on said hand truck, a protecting and heat insulating shell enclosing said tank, means for draining the tank, an electric refrigerating mechanism on said truck below the tank including a compressor and coils for receiving coolant from the compressor closely embracing the sides and ends of the tank and the bottom wall of the tank, a cover for said tank having a filling neck and a baffle and distributing plate removably supported by the walls of the tank directly below the neck including sides and ends inclined toward the side and end walls of the tank for directing milk receive from said neck toward said walls of the tank, the peripheral edges of said baffle and distributing plate having spaced notches for flow of milk.

MELVIN P. BANNISTER.
JOHN F. PFEIFER.

REFERENCES CITED

The following references are of record in the file of this patent:

UNITED STATES PATENTS

| Number | Name | Date |
|---|---|---|
| 2,024,639 | Greene | Dec. 17, 1935 |
| 2,048,291 | Quinn | July 21, 1936 |
| 2,186,900 | Dick | Jan. 9, 1940 |
| 2,287,681 | Hazard | June 23, 1942 |
| 2,470,979 | Duncan | May 24, 1949 |